United States Patent [19]

Brodersen

[11] 3,974,702

[45] Aug. 17, 1976

[54] FLUIDIC INERTIAL GYRO

[75] Inventor: Rolf K. Brodersen, Orlando, Fla.

[73] Assignee: The United States of America as represented by the Secretary of the Navy, Washington, D.C.

[22] Filed: Mar. 24, 1975

[21] Appl. No.: 561,386

[52] U.S. Cl. .................................. 74/5.6 B; 74/5.7
[51] Int. Cl.² ................ G01C 19/28; G01C 19/12
[58] Field of Search ................ 74/5.6 R, 5.6 B, 5.7, 74/5.4, 5 R

[56] References Cited
UNITED STATES PATENTS

| | | | |
|---|---|---|---|
| 1,718,539 | 6/1929 | Dieter | 74/5.7 |
| 2,086,896 | 7/1937 | Carter | 74/5.7 X |
| 2,504,166 | 4/1950 | Tracy | 74/5.7 X |
| 3,606,793 | 9/1971 | Johnston | 74/5 R |

Primary Examiner—Samuel Scott
Assistant Examiner—F. D. Shoemaker
Attorney, Agent, or Firm—R. S. Sciascia; J. W. Pease

[57] ABSTRACT

A continuous run, single axis, single degree of freedom gas operated fluidic inertial gyro comprising a housing, a gimbal assembly supported in the housing on gas thrust and journal bearings, a turbine type spin rotor with axle mounting the rotor in the gimbal assembly, and shaft means forming part of the gimbal assembly and providing passageways to channel input flow to and vent flow from the gas turbine type spin rotor along and parallel to the gimbal axis to minimize drift error. The gyro is also provided with a pneumatic torquer to provide gimbal adjustment and fluidic pickoff to provide analog gas pressure readouts of pounds per square inch convertible to angular deflection in degrees.

4 Claims, 10 Drawing Figures

FLUIDIC INERTIAL GYRO

BACKGROUND OF THE INVENTION

The invention is in the field of gyroscope devices and relates in particular to a fluidic inertial gyro of the single axis, single degree of freedom, continuous run type capable of operating entirely on gas with no electrical inputs or outputs and with gas bearing gimbal support.

In inertial control systems for land, air, space or sea vehicles, measurements made by accelerometers and other devices must be carried out in relation to a stable system of reference which can be defined in terms of angular relationships, such as angular precession, obtainable from gyroscopic devices. In guidance systems, control signals are supplied by displacement gyros, these signals being proportional to the angular attitude deviation of the guided vehicle or missile. For accurate control and smooth recovery, one must also supply a signal proportional to the rate of deviation, and such signals are provided by rate gyros which have restricted gimbal angular freedom to rotate about one axis only.

In many important applications, including those mentioned above, it is desirable to provide gyros requiring an upper limit of typically 1°/hour gyro drift rate. Such accuracy is obtainable from some electromechanical gyros. However, while fluidic inertial gyros are more desirable for interfacing with many gas operated control systems there is not, to applicant's knowledge, a fluidic inertial guidance system capable of providing the above recited drift performance. In the present invention a selection and arrangement of elements has been made to provide a gyro directed to eliminating disturbing torques while providing gas drive and torquers and pickoffs also pneumatically operated. The result is an improvement in residual drift rate of a factor of 10 over any known existing fluidic gyros.

SUMMARY OF THE INVENTION

The invention comprises a single axis gyro with inertial guidance performance capability, operated by gas only, with no electrical inputs or outputs, and with gas bearing gimbal support. The device accepts pneumatic or fluidic inputs and delivers outputs of the same type. The shafts, forming part of the gimbal and through which gas is admitted to spin a gyro rotor rotatably supported within the gimbal, are formed with passageways, to channel input flow to and venting flow from the gas turbine type spin-rotor along and/or parallel to the gimbal axis to achieve low drift error. The invention also provides for fluidic/pneumatic vane-type pickoffs and torquers for angular readout (output) and precession torquer input. Also provided under the invention are adjustable gas thrust bearings to obtain accurate right angle alignment between journal and thrust gas bearings for gimbal support, and the option of a matched set of precision feed-restrictors to permit thrust-bearing alignment on the basis of back pressure readout for the restrictors.

DESCRIPTION OF THE DRAWING

FIG. 9 is a diagrammatic cross-sectional view showing an arrangement for adjusting the thrust bearing, the parts being exaggerated in dimension to be able to show the small maximum adjustment of 0.0002 in.

DESCRIPTION OF THE PREFERRED EMBODIMENT

Figure 1:
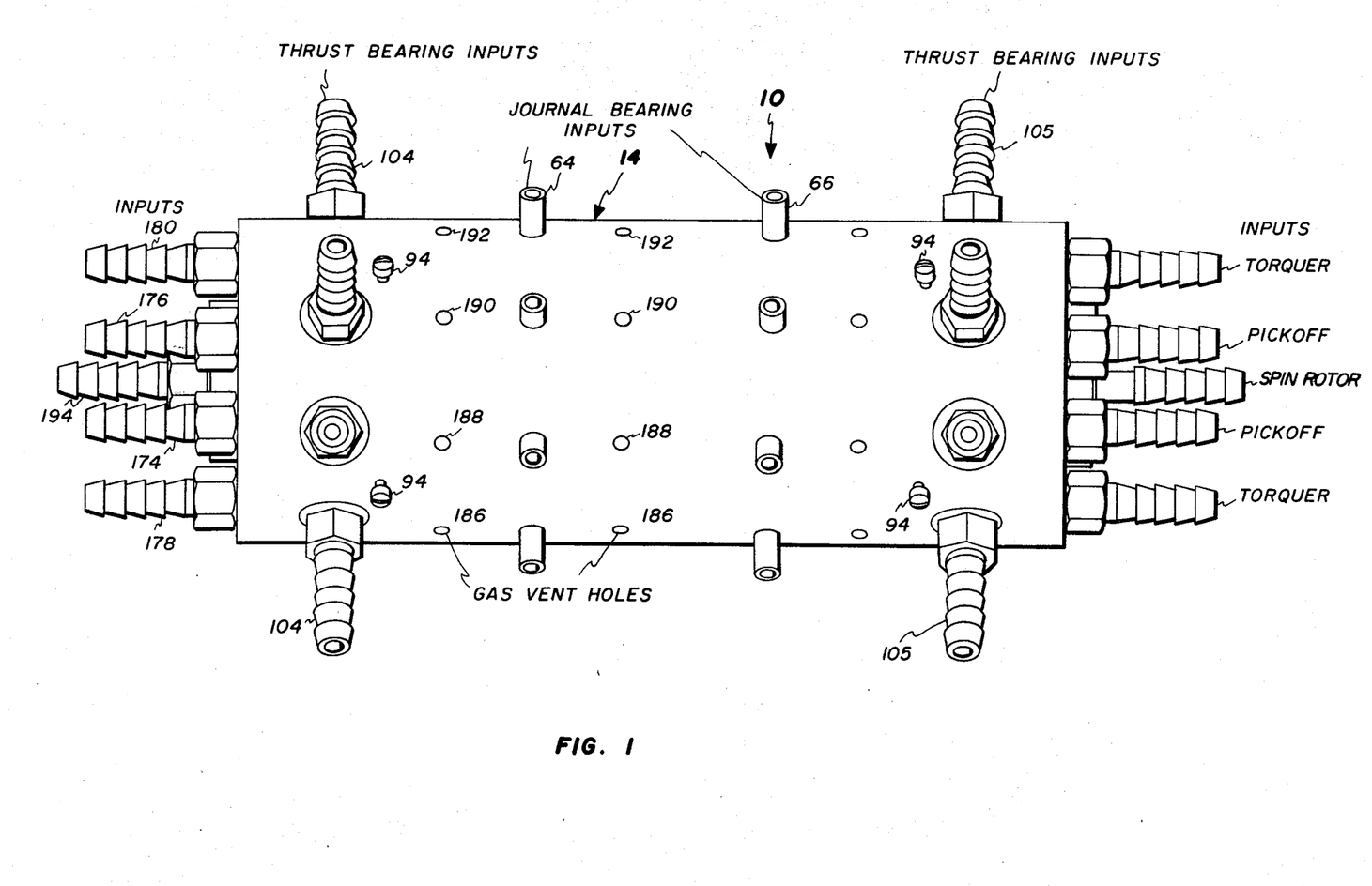
FIG. 1 is a side elevational view of a fluidic inertial gyro incorporating the invention and including gimbal assembly with spin-rotor.
Figure 2:
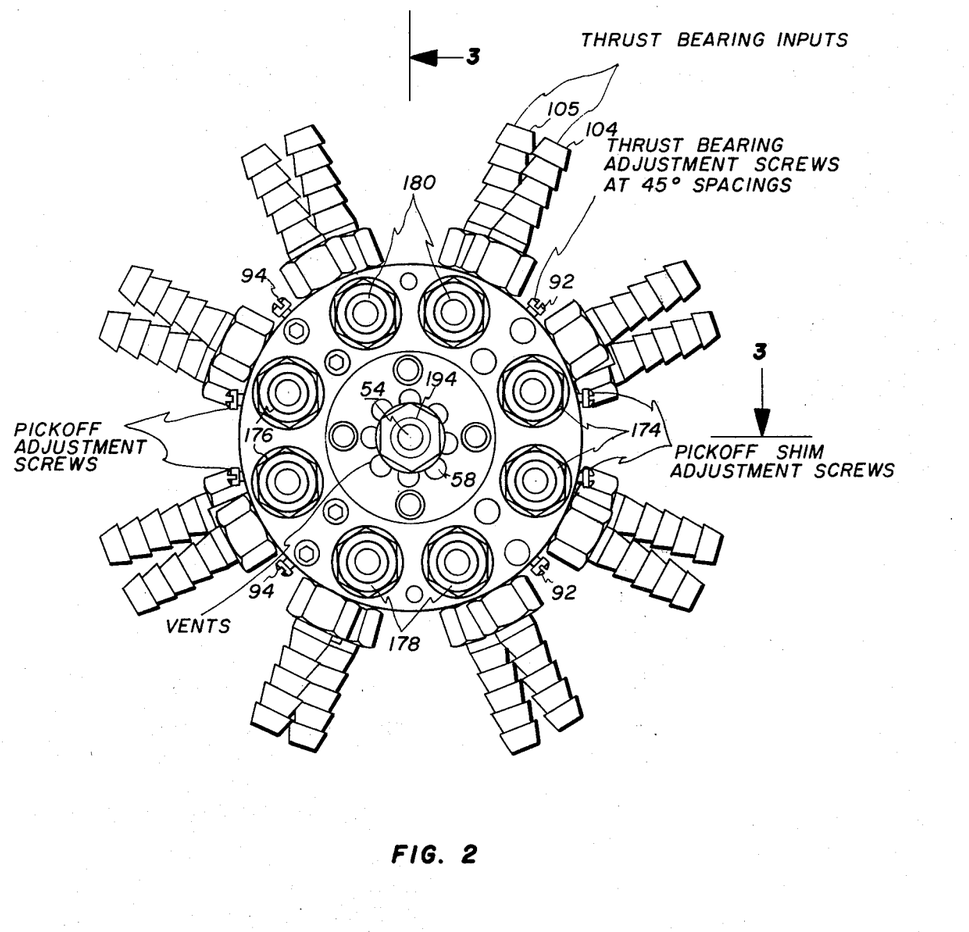
FIG. 2 is an end view of the apparatus of FIG. 1.
Figure 3:
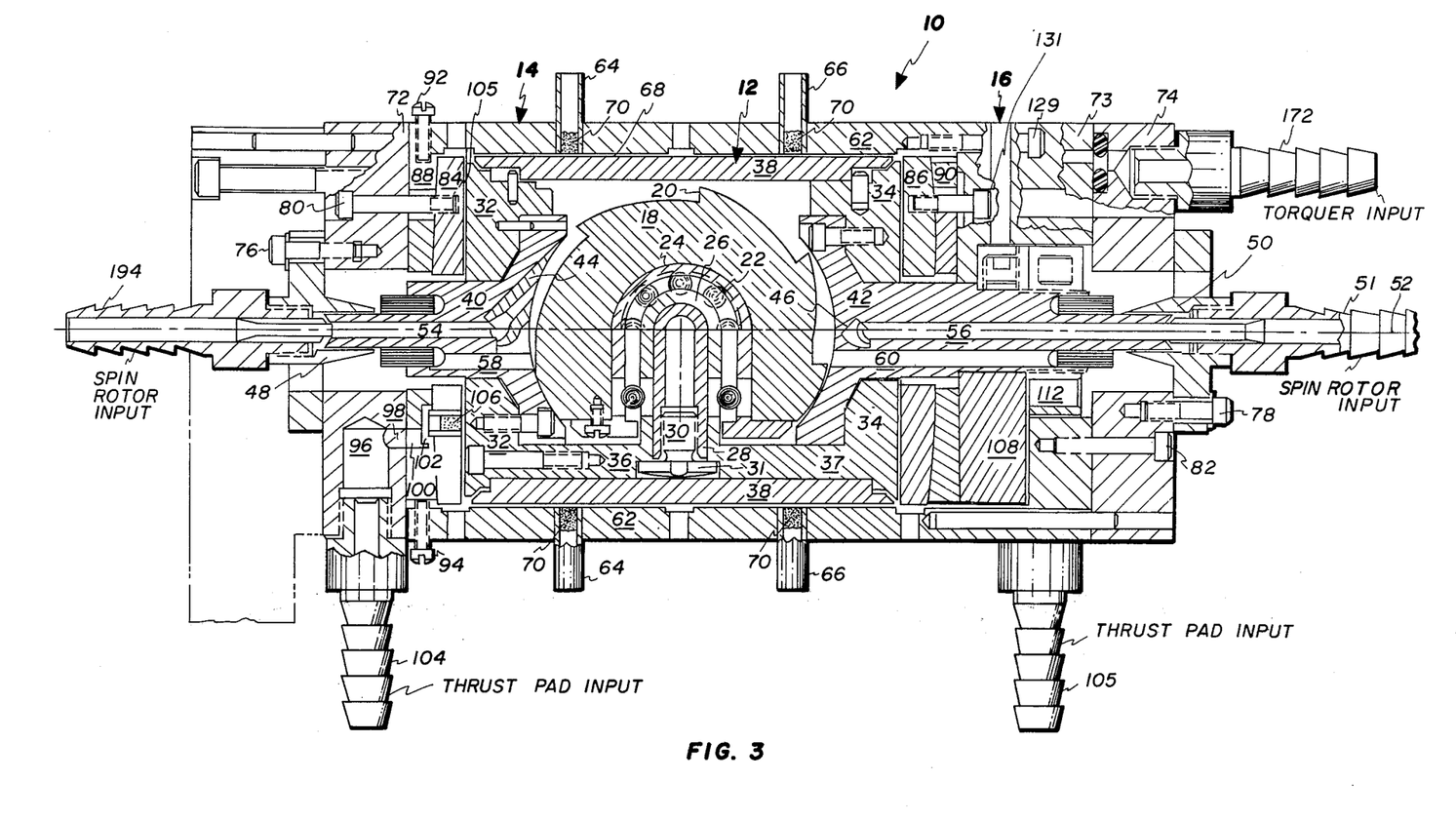
FIG. 3 is a composite cross-section taken on line 3—3 of FIG. 2.
Figure 4:
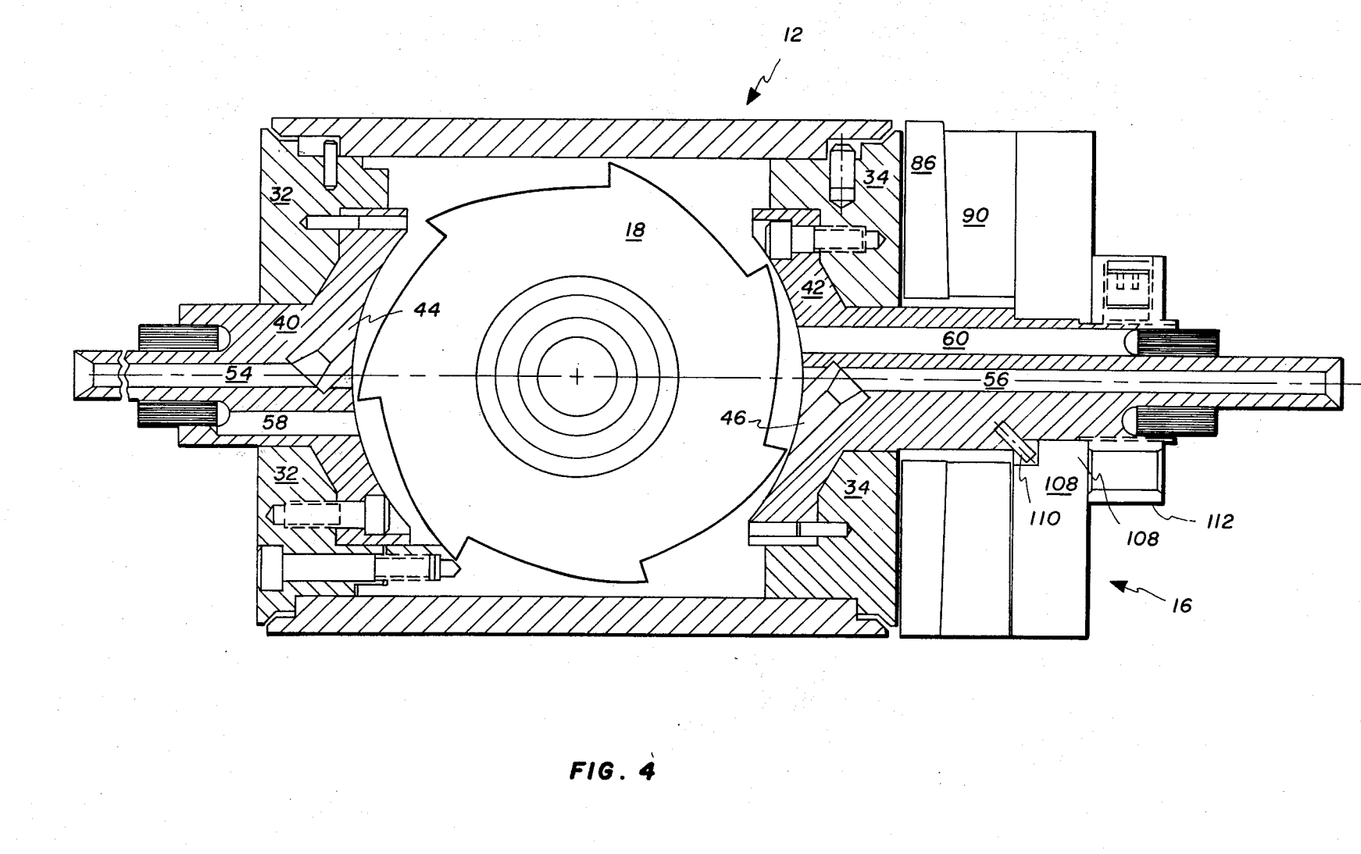
FIG. 4 is a cross-section of the spin-rotor and shaft of FIG. 1 taken normal to the gimbal axis.

My invention comprises an improved gyroscope providing high performance, typically 1° per hour drift, and continuous operating time capability, utilizing gas flow exclusively for its operation. It is a single degree of freedom gyro provided with a gas bearing supported gimbal assembly. In the drawing, FIGS. 1 through 8 show a gyroscope incorporating the invention. FIGS. 1 and 2 provide side and end views by which various gas inlets and vents may be conveniently identified, and FIGS. 3 and 4 are sectional views through which the gimbal assembly and its associated housing will be described.

Figure 5:
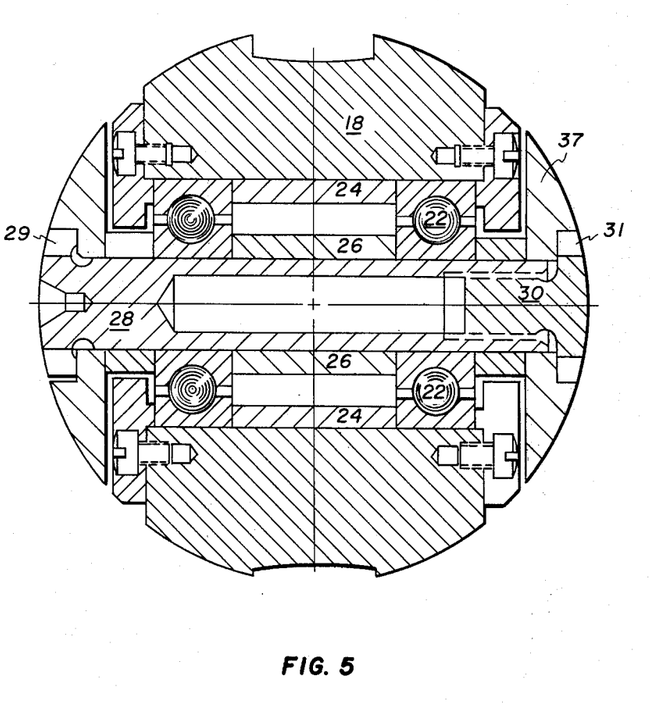
FIG. 5 is a vertical cross-section of a rotor assembly forming part of the gyro of FIG. 1.

Referring initially to FIG. 3, the gyroscope indicated generally at 10 includes a gimbal assembly, generally indicated at 12, a housing, generally indicated at 14, and a torquer and pickoff assembly generally indicated at 16. The gimbal assembly includes a spin-rotor in the form of a gas turbine heavy metal rotor 18 formed with turbine buckets 20 machined into its rim, and is rotatably supported by a set of preloaded angular contact ball bearings 22 with a 35° contact angle for isoelasticity. The ball bearings are supported in race means 24 and 26, and the race is supported on shaft members 28 and 30 (best seen in FIG. 5). Flanged head portions 29 and 31 of the respective shaft members 28 and 30 provide means for locking the shaft in support on elements 32, 34, 36 and 37 of the gimbal assembly as shown in FIGS. 3 and 5, and as will be described hereinafter. In addition to the rotor 18 and its supporting shaft means 28, 30 the gimbal assembly includes, as shown in FIG. 3, end members 32 and 34 having lock extension portions 36 and 37 and cylindrical journal bearing member 38, together with gimbal shaft members 40 and 42.

The rotor 18 is driven by two spin nozzles 44 and 46 (FIGS. 3 and 4) which supply the necessary gas power flow to sustain the desired gyro spin rate. Gas input to the nozzles 44 and 46 is provided by rotary joints 48 and 50 (FIG. 3) designed to provide a pressurized gas layer for limited oscillation about the gimbal axis identified as 52. Passageways 54 and 56 along the gimbal axis 52 are provided in the respective shafts 40 and 42 to pass gas to the jet nozzles 44 and 46. Output from the spin rotor is provided for by a plurality of vents 58 and 60 formed respectively in the gimbal shafts 40 and 42 and in symmetrical distribution around the gimbal axis 52 to minimize drift producing error torquers. Input gas line fittings 51 and 194 are provided for the respective rotary joints 50 and 48.

The gyroscope housing 14, in addition to other functions, provides gas pressure end thrust and lateral journal bearing support. Thus, housing 14 includes a central cylindrical section 62 formed with two spaced rows of angularly disposed input restrictors 64 and 66. In FIG. 3, one row is identified by the input port pipes 64, of which there are eight at 45° intervals. The other row is identified by input port pipes 66 in the same arrangement. The input pipes are passed through the cylinder 62 to pressurize a journal gas bearing film identified at 68 (FIG. 3). Restrictors indicated at 70 are placed in the pipes 64, 66 to ensure balanced pressure throughout the journal gas film layer 68.

Housing end caps 72 and 74 support respectively the rotary gas bearing joints 48 and 50 via sets of screws indicated at 76 (for cap 72) and 78 (for cap 74). Also supported from the end caps 72 and 74 via studs 80, 82, 129 and 131 are thrust bearings 84 and 86 which are each adjustable by slidable adjusting rings 88 and 90. The abutting surfaces of ring 88 and bearing 84 and ring 90 and bearing 86 are curved spherically as indicated to provide adjustment of the thrust bearings to a position normal to the gimbal axis to thus mate with the adjacent surface of the associated of end members 32 and 34. The rings 88 and 90 are moved by sets of four adjusting screws, one set for ring 88 being shown at 92 and 94 to indicate 180° opposed adjusting screws.

Figure 9:
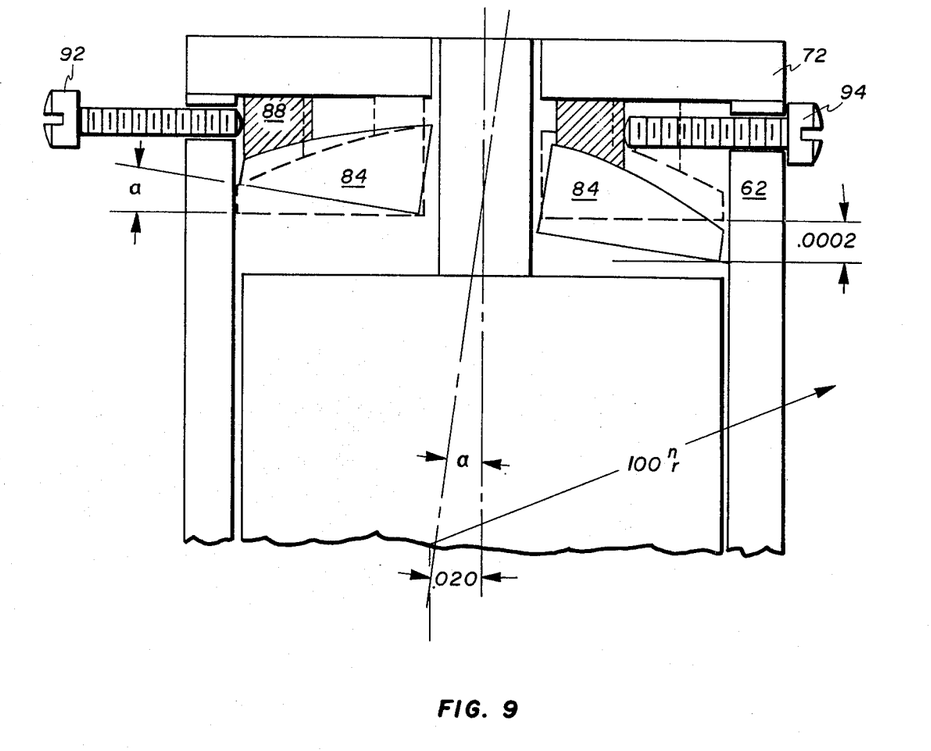

To be more explicit on the above, please refer to FIG. 9 which is diagrammatic and in which dimensions have been exaggerated to show how sliding the adjusting ring 88 from dotted line position indicated to solid line position indicated, by screws 92 and 94, thereby cants the thrust bearing 84 through an adjusted angle δ as indicated.

Returning to FIGS. 3 and 4 and initially to FIG. 3, it will be noted that end housing 72 is channeled to form passageways at 96 and 98 and adjusting ring 88 is channeled to form passageways 100 and 102 to receive a thrust pad input connection 104 and pass gas under pressure to form the end thrust gas layer 105 between adjacent gas bearing surfaces of thrust bearing 84 and gimbal end member 32. Matched sets of restrictors 106 of sintered steel or other suitable material are provided in angularly spaced positions in the thrust bearing 84 to equalize pressure in the gas layer 105. In the embodiment shown and described herein there are eight thrust pad inputs for each of the thrust pads 84 and 86. A description of one input as above should suffice for an understanding of the structure.

As thus far described, it will be noted that applicant's invention includes the concepts of a single axis gyro of inertial guidance performance type, operable continuously by gas only and in which low drift error capability is provided by channeling input flow to, and venting flow from, a gas-turbine type spinrotor along and/or parallel to the gimbal axis. The invention also includes gas bearing support for thrust and journal bearings with adjustability of angle of the thrust bearing and with restrictors to develop and maintain equal thrust pressures and equal journal bearing pressures, as well as the advantage of a gas layer separated rotary joint for spin rotor gas input.

Figure 7:
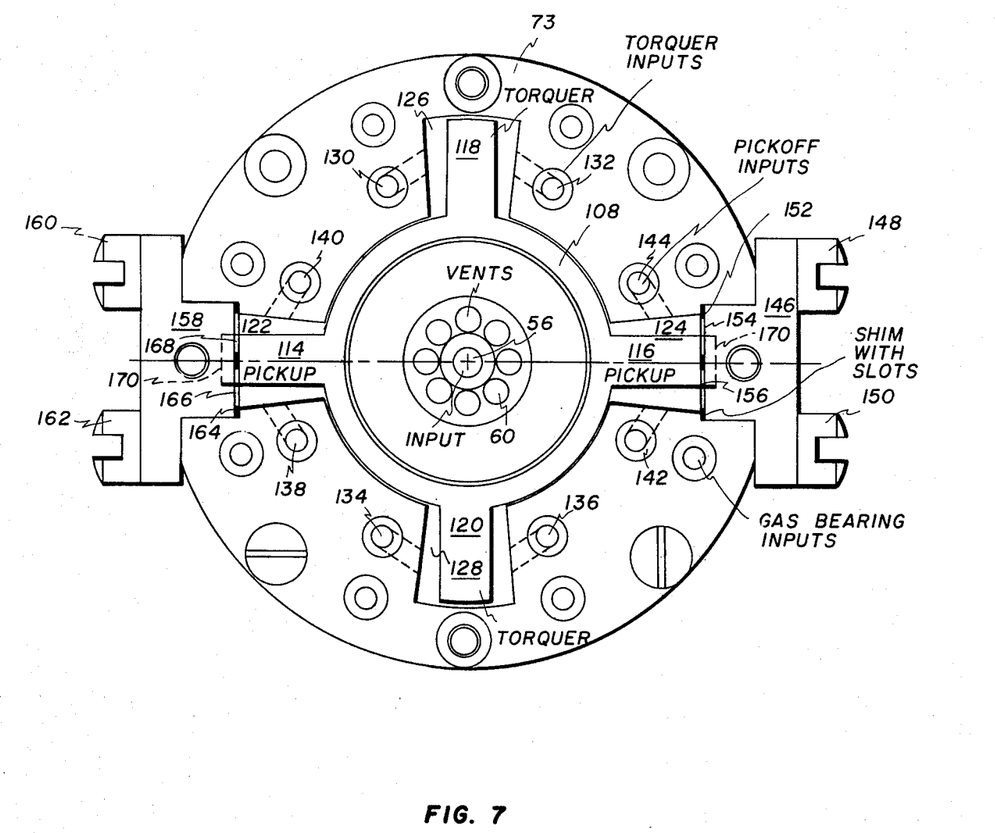
FIG. 7 is a cross-sectional view normal to the gimbal axis of the gyro and provided to illustrate the torquer and pickoff vane ring arrangement and porting thereto.

Referring again to FIGS. 3 and 4, attention is now directed to the torquer and pickoff assembly generally indicated at 16 which includes a ring 108 attached to the gimbal assembly 12 by pins 110 and a nut 112 threaded on shaft 42. Referring to FIG. 7, the ring 108 is formed with two opposed pickoff vanes 114 and 116 and two opposed torquer vanes 118 and 120 for pickoff and torquer functions. Vanes 114 and 116 extend into and have limited movement (for oscillation about the gimbal axis 52) in respective chambers 122 and 124, and vanes 118 and 120 extend into and have limited movement in respective chambers 126 and 128, all of the chambers being formed in an adapter housing section 73 forming part of the overall gyro housing 14 and held to the central section 62 thereof by bolts as indicated at 129 in FIG. 3.

The two torquer vanes 118 and 120 are thus part of a balanced four-vane ring 108 attached to the gimbal 12, outside the thrust bearing 86. The two separate torquer chambers 126 and 128 receive suitable gas pressure to provide respectively high and low level torquer, one for coarse initial alignment (slewing) and the other for fine trim, final adjustment (bias torquer). Each torquer vane moves in its associated chamber with only a small (typically 0.001 inch) air gap, large enough to prevent friction, but small enough to restrict the resultant leakage flow and thus permit rapid build-up of differential pressure across the vane. Torquer input passageways in the adapter ring 73 are indicated at 130, 132, 134 and 136.

The two remaining vanes 114 and 116 (FIG. 7) on the vane ring 108 are utilized for analog signal pickoff. By the use of the two diametrically opposite vanes, error signals due to linear displacement of the gimbal under g-loading are minimized. The pickoff chambers 122 and 124 of the associated pickoff vanes 114 and 116 are provided respectively with input passageways 138, 140, 142 and 144 formed in the adapter ring 73. Pressures are adjusted to a null reading for opposite sides of each pickoff vane such that rotation of the ring 108 may produce an analog readout of differential pressure corresponding to the angular deflection of the gyroscope's gimbal assembly 12 relative to housing 62 about axis 52.

Figure 6A:
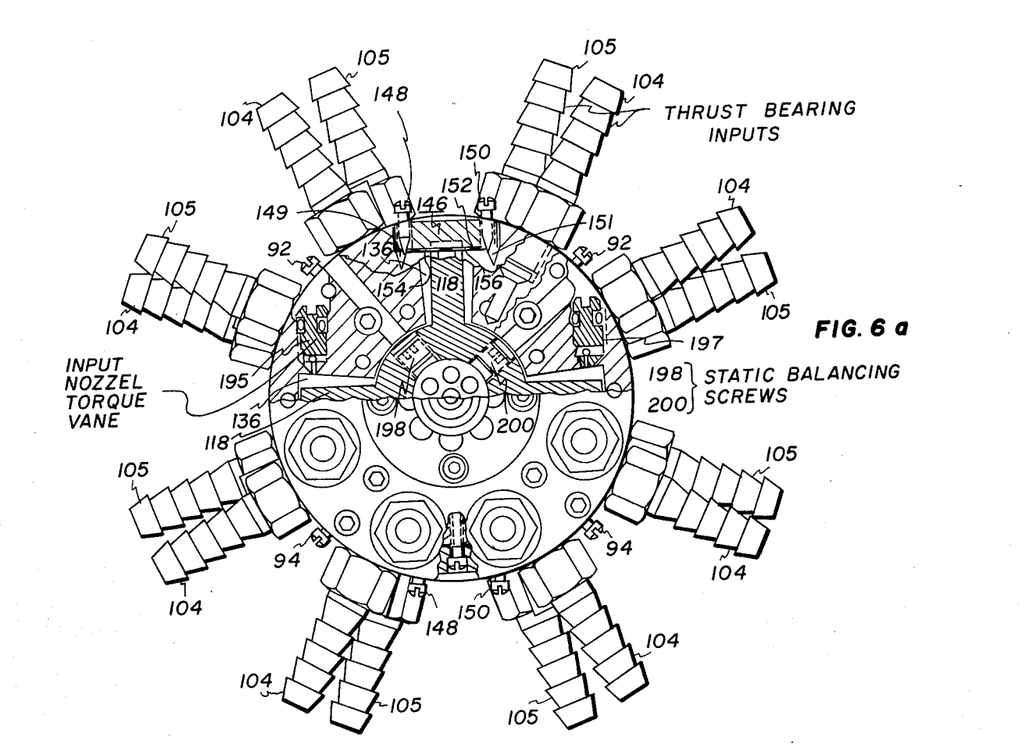
FIGS. 6A and 6B are associated end and partial side views of the gyro of FIG. 1 with portions broken away and in cross-section to show inner passageways and torquer and pickoff vane arrangement.

This back pressure sensing is obtained by providing pickoff sensing elements including for each pickoff vane a block, a slotted shim, and adjusting screws. Thus, in FIG. 7 are shown block 146, screws 148, 150 and shim 152 having slots 154 and 156, the slots being also identified in FIGS. 6A and 6B. For pickoff chamber 122 (FIG. 7) is provided a sensor including block 158, screws 160, 162, shim 164 with slots 166 and 168. Referring to FIG. 6A, the cross sectional view indicates that the screws 148 and 150 enter guide holes 149 and 151 formed in the adaptor 73 in wider spaced relation than the screws 148 and 150 such that tightening screw 148 while loosening screw 150 moves the block 146 and shim 152 to the left. The reverse action on screws 148 and 150 adjusts the block and shim to the right as viewed in FIG. 6A. By this means, the slots 154 and 156 may be adjusted to null point for given conditions. The shims may also be exchanged for shims with different size slots for impedance matching or change in scale factor. The end surfaces 170 (FIG. 7), of the pickoff vanes 114 and 116 are finished as optical flats for use in an optical readout technique for pickoff calibration.

Figure 8:
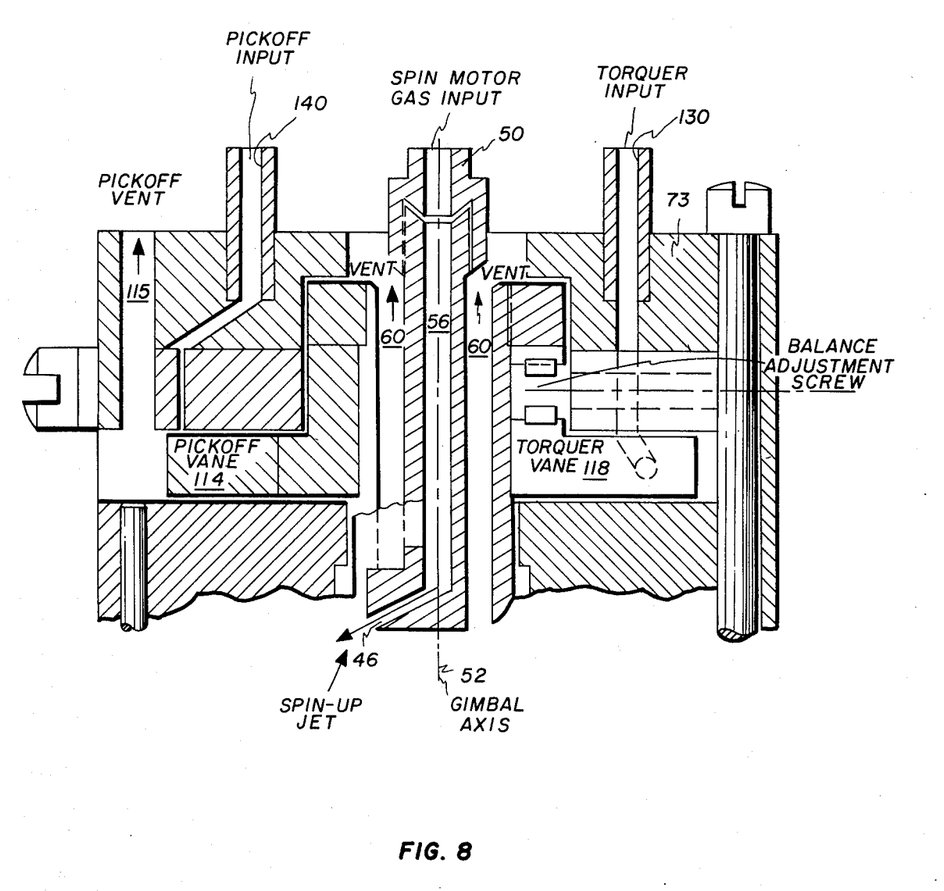
FIG. 8 is a conceptional schematic view partially in cross-section along the gyro gimbal axis and used to complement FIG. 7 in describing the torquer-pickoff vane arrangement.

In FIG. 8 an enlarged partial cross-section schematic view along the gimbal axis 52 is provided to show the relationships of the spin-rotor input passageway 56, jet nozzle 46, torquer input passageway 130 and torquer vane 118, pickoff input passageway 140 and pickoff vane 114, together with the concentric arrangement of spin-rotor vents 60 and pickoff vent 115.

Figure 6B:
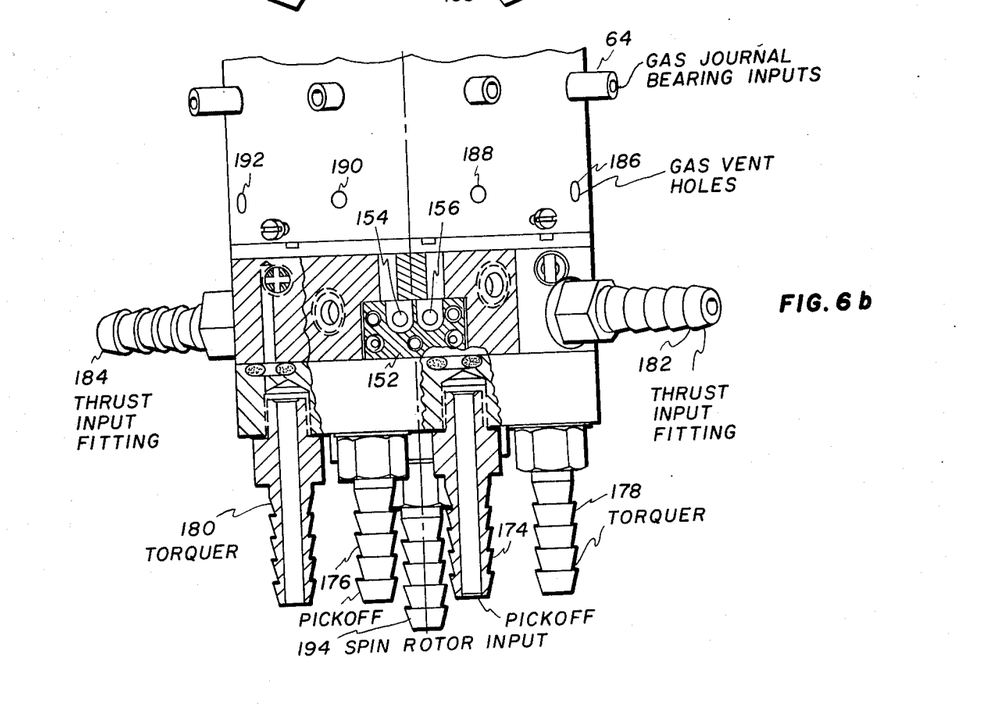

In FIG. 3 at the upper right is shown a torquer input fitting 172 for passing gas to associated torquer passageways. The torquer inputs are at four places corresponding to the passageways 130, 132, 134 and 136 of FIG. 7. In FIG. 6B is shown a pickoff connector 174 connected to one pickoff chamber passageway. There are typically four pickoff fittings, one for each of the pickoff passageways 138, 140, 142 and 144 shown in FIG. 7.

In FIG. 6B, 174 and 176 are pickoff fittings, 178 and 180 are torquer fittings, 182 and 184 are thrust bearing fittings, and 186, 188, 190 and 192 are vent holes for the gas journal bearing, and 64 indicates one row of gas journal bearing inputs. Number 194 identifies the spin-rotor input fitting associated with passageway 54 in FIG. 3.

FIG. 6A, numbers 104 and 105 identify the two radial rows of thrust bearing inputs. Two input nozzles for the torquer vanes are identified at 195 and 197. Weighted screws 198 and 200 are two of four screws screwably adjustable radially to vary weight distribution in static balancing of the gimbal assembly.

From the above it is evident that additional aspects of my invention include a single axis gyro with inertial guidance performance capability which may be compatible with fluidic/pneumatic guidance and/or control systems for land, air, space or sea vehicles accepting pneumatic or fluidic inputs and delivering output signals of the same type. The invention also contemplates, as described, vane-type pickoffs and torquers for angular readout (output) and precession torquer input. The invention further includes the feature of adjustable gas-thrust bearings to obtain accurate right angle alignment between journal and thrust gas-bearings for gimbal support, and the additional aspect wherein the thrust gas-bearings are equipped with a matched set of precision feed restrictors to permit thrust bearing alignment on the basis of back pressure readout for such restrictors.

Obviously many modifications and variations of the present invention are possible in the light of the above teachings. It is therefore to be understood that within the scope of the appended claims the invention may be practiced otherwise than as specifically described.

What is claimed is:

1. A continuous run, single axis, single degree of freedom, gas operated fluidic inertial gyro comprising
   a. a housing having a cylindrical journal gas bearing section and end thrust gas bearings;
   b. a gimbal assembly having a gimbal axis;
   c. a turbine type spin rotor and means rotatably supporting the latter in said gimbal assembly;
   d. said gimbal assembly including end caps cooperative with said end thrust bearings and a gas bearing sleeve cooperative with said housing journal gas bearing section to form gas seal means supporting said gimbal assembly within said housing;
   e. said gimbal assemblies including also shaft means formed with passageways to channel input flow to and vent flow from said gas turbine type spin rotor along and/or parallel to said gimbal axis to minimize drift error;
   f. a pickoff torquer ring fixed to said gimbal assembly within said housing and having vane type pickoffs and torquers;
   g. said housing having torquer channels and nozzles to provide inputs to opposite sides of said torquer vanes to provide initial coarse gimbal adjustment and fine low level bias final correction;
   h. said housing having pickoff channels to provide analog gas pressure readouts of pounds per square inch convertible to angular deflection in degrees.

2. Apparatus according to claim 1
   a. said end thrust gas bearings comprising each a thrust pad, adjustment means and an adjustment plate moveable by adjustment of said adjustment means to obtain accurate right-angle alignment between end plates and thrust gas bearings for gimbal support.

3. Apparatus according to claim 1 wherein
   a. said shaft means passageways include for each shaft a control passageway coaxial with said gimbal axis and a flow nozzle positioned to direct turbine gas input to the buckets of said turbine type rotor and including also a plurality of gas exit vents concentrically arranged about said gimbal axis and parallel thereto.

4. Apparatus according to claim 1 including
   a. a rotary gas pressure film separated input joint for each shaft means for supplying gas to said rotor while leaving said gimbal rotatably adjustable about said gimbal axis.

* * * * *